July 20, 1937.   G. K. WOODRING   2,087,369
FISHHOOK
Filed April 25, 1936

Inventor
G. K. Woodring
By Watson E. Coleman
Attorney

Patented July 20, 1937

2,087,369

UNITED STATES PATENT OFFICE 2,087,369

FISHHOOK

Glen K. Woodring, Cottonwood Falls, Kans.

Application April 25, 1936, Serial No. 76,469

4 Claims. (Cl. 43—40)

This invention relates to fishing devices and more particularly to an improved type of fish hook, which is so constructed as to firmly hold bait thereupon.

An object of this invention is to provide in combination with a fish hook a bait holding means in the form of a relatively small hook which may be adjusted longitudinally of the main hook so that bait may be held in proper position on the main hook.

Another object of this invention is to provide in a fishing device of this kind an adjustable bait tensioning and holding means which is adjustably carried by the main hook and which will place the bait, where a relatively large bait is used, under tension in order that a fish cannot loosen the bait from the main hook without being caught on the barb of the main hook.

The above and various other objects and advantages of this invention will in part be described in, and in part be understood from the following detail description of the present preferred embodiment, the same being illustrated in the accompanying drawing, wherein:—

Figure 1:
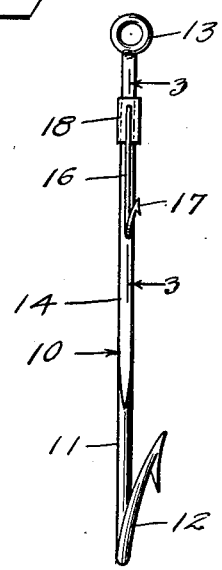
Figure 1 is a detail front elevation of a fish hook having a bait tensioning means mounted thereon which is constructed in accordance with an embodiment of this invention.

Referring to the drawing, wherein like symbols designate corresponding parts throughout the several views, the numeral 10 designates generally a fish hook having a shank 11 provided with an eye 13 at one end and a barb 12 at the opposite end. This fish hook 10 may be of any suitable size and the shank 11 is of suitable length and is provided with a square portion 14 for a considerable portion of the length thereof. A bait tensioning or supplemental hook 15 is carried by the main hook 10 and comprises a shank 16 having a barb 17 at one end thereof. The shank 16 is provided with a sleeve 18 at the upper end which is square in transverse section and is slidable on the square shank portion 14.

The shank portion 14 along the rear side thereof is provided with a longitudinally extending groove 19 and this shank portion 14 also has a plurality of longitudinally spaced apart notches 20 in which the bill 21 of a spring pressed locking member 22 engages. A knob or handle 23 is secured to the locking member 22 so as to facilitate the withdrawal of the bill 21 from a selected notch. This locking member 22 is secured by fastening devices 24 in the form of rivets or the like to the rear side of the sleeve 18. These notches 20 are so formed within the groove 19 so that the locking member 22 may be readily moved in a direction toward the eye 13 but the locking member 22 will engage in a notch 20 upon movement of the supplemental hook 15 and the sleeve 18 in a direction toward the barb 12.

Figure 2:
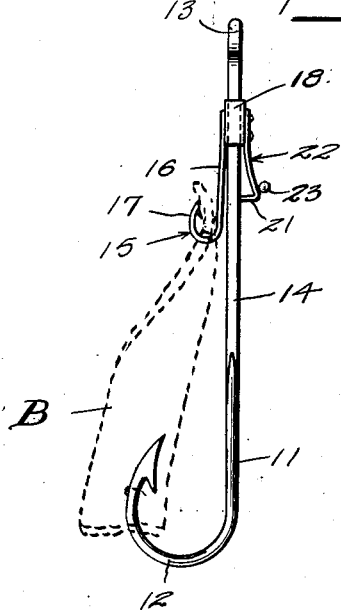
Figure 2 is a detail side elevation of the device showing the manner in which the bait, shown in dotted lines, is tensioned on the device.
Figure 3:
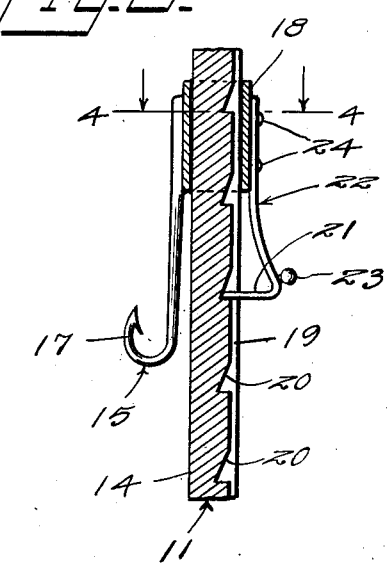
Figure 3 is an enlarged longitudinal section taken on the line 3—3 of Figure 1.
Figure 4:
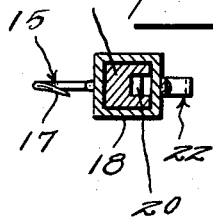
Figure 4 is an enlarged transverse sectional view taken on the line 4—4 of Figure 3.

In the use of this fishing device, the eye 13 may have the usual fish line secured thereto and the bait B may have one portion thereof secured to the barb 12, as shown in dotted lines in Figure 2, and another portion of this bait may be hooked on to the barb 17 of the bait tensioning or supplemental hook 15. When the bait B is secured to the hook 15, this hook may be moved upwardly or in the direction of the eye 13 until the proper tension is had on the bait B and by reason of the locking member 22 and the notches 20, the hook 15 will be releasably held against movement downwardly or in the direction of the barb 12. The locking member 22 may be readily released from a selected notch 20 and moved downwardly toward the barb 12 by pulling the knob 23 outwardly so as to withdraw the bill 21 from the notched portion of the shank 14 and in this position the hook 15 can be easily moved to the desired position.

The square shank 14 of the main hook will maintain the bait tensioning or supplemental hook 15 against turning movement on the main hook 10 so that the hook 15 will, at all times, be disposed on the front side of the main hook and the locking means 22 will not be placed under any twisting strain when the bait B is being grasped by a fish or the like.

I claim:—

1. A fishing device comprising a hook provided with a shank, a barb at one end of the shank, an eye at the other end of the shank, a second hook relatively smaller than said first hook provided with a shank, a barb at one end of the second shank, a sleeve at the other end of the second shank slidable on the first shank, said first shank and said sleeve being so shaped as to hold the sleeve against rotation relative to said first shank, and releasable locking means carried by said sleeve for holding the barb of the second hook in a predetermined position relative to the barb of the first hook.

2. A fishing device comprising a main hook provided with a square shank portion, a bait tensioning hook, means for slidably securing the bait tensioning hook on the shank of the main hook, and coacting means carried by the main hook and the bait tensioning hook for releasably locking the bait tensioning hook against movement in one direction.

3. A fishing device comprising a main hook provided with a square shank portion, a bait tensioning hook, a square sleeve fixedly secured to the bait tensioning hook and slidably engaging the square shank portion of the main hook, said square shank portion having a plurality of longitudinally spaced apart notches in one side thereof, and a spring pressed locking member carried by the bait tensioning hook and engageable in a selected notch whereby to hold the bait tensioning hook against longitudinal movement in at least one direction.

4. A fishing device comprising a main hook provided with a square shank, a bait tensioning hook, a square sleeve secured to the shank of the bait tensioning hook and slidably engaging the square shank of the main hook, said square shank being provided in one side thereof with a longitudinally extending groove, said shank also being provided with a plurality of longitudinally spaced apart notches within the groove, and a spring pressed locking member carried by the sleeve and engageable in a selected notch to releasably hold the bait tensioning hook against movement on the shank of the main hook.

GLEN K. WOODRING.